(12) United States Patent
Meek et al.

(10) Patent No.: US 7,430,550 B2
(45) Date of Patent: Sep. 30, 2008

(54) SAMPLING METHOD FOR ESTIMATING CO-OCCURRENCE COUNTS

(75) Inventors: Christopher A. Meek, Kirkland, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 11/055,952

(22) Filed: Feb. 11, 2005

(65) Prior Publication Data

US 2006/0184572 A1    Aug. 17, 2006

(51) Int. Cl.
*G06F 17/30* (2006.01)
(52) U.S. Cl. ............... 707/3; 707/1; 707/10; 707/104.1
(58) Field of Classification Search .............. 705/10, 705/26; 707/1, 3, 10, 104.1
See application file for complete search history.

(56) References Cited

U.S. PATENT DOCUMENTS

| | | | | |
|---|---|---|---|---|
| 6,487,541 | B1 * | 11/2002 | Aggarwal et al. | 705/26 |
| 6,498,955 | B1 * | 12/2002 | McCarthy et al. | 700/1 |
| 2002/0156763 | A1 * | 10/2002 | Marchisio | 707/1 |
| 2002/0178057 | A1 * | 11/2002 | Bertram et al. | 705/14 |
| 2002/0199194 | A1 * | 12/2002 | Ali | 725/46 |
| 2005/0261987 | A1 * | 11/2005 | Bezos et al. | 705/27 |

OTHER PUBLICATIONS

D. Chickering, et al., Fast Learning from Sparse Data, In Proceedings of Fifteenth Conference on Uncertainty in Artificial Intelligence, Stockholm, Sweden, Morgan Kaufmann, Aug. 1999. Also appears as Technical Report MSR-TR-00-15, Microsoft Research, Feb. 1999 (Revised May 1999).

Moore, A.W., et al., Cached Sufficient Statistics for Efficient Machine Learning with Large Datasets, Journal of Artificial Intelligence Research, 1998, pp. 67-91, vol. 8.

* cited by examiner

*Primary Examiner*—Hosain T Alam
*Assistant Examiner*—Amy Ng
(74) *Attorney, Agent, or Firm*—Amin, Turocy & Calvin, LLP (57) ABSTRACT

The subject invention leverages data sampling techniques to provide an efficient means to determine co-occurrence count estimations for objects and features from relational data, simplifying measure-of-association determinations. By providing an efficient mechanism to estimate co-occurrence counts, instances of the subject invention can be incorporated directly into a database, increasing its versatility and performance for such uses as collaborative filtering recommendations. Other instances of the subject invention can be utilized for enhancing database query selectivity, optimizing query performance through employment of á priori co-occurrence counts.

17 Claims, 8 Drawing Sheets

SAMPLING METHOD FOR ESTIMATING CO-OCCURRENCE COUNTS

TECHNICAL FIELD

The subject invention relates generally to data mining, and more particularly to systems and methods for estimating co-occurrence counts for collaborative filtering and for query optimization in relational databases.

BACKGROUND OF THE INVENTION

Data mining is typically the extraction of information from data to gain a new, insightful perspective. Data mining can employ machine learning, statistical and/or visualization techniques to discover and present knowledge in a form that is easily comprehensible to humans. Over the last few years, however, the sizes of databases have been exponentially increasing as the ability to gather data more efficiently increases. This has produced enormous databases that take immense amounts of time to analyze. This holds true despite the ever increasing speeds gained in computer processing technology and data storage access methods.

Pairing up items for selling is often known as "associative selling." An effort is made to correlate various items/products based upon a particular buyer's past buying habits and/or the past buying habits of other buyers who purchased similar items in the past. This associative process can also be expanded beyond direct product sales. It can be utilized indirectly to enhance sales such as with television viewing habits. A television company can predict that most viewers of show X are men who prefer rugged sports such as football, extreme mountaineering, and rugby. This would give the television company a good idea that programming an opera or ballet in this time slot would probably reduce their viewer ratings. Even the existing show could be "enhanced" with more rugged content to increase the size of show X's audience. A successful show with a large audience naturally draws advertisers who want to reach more of their market. Thus, the viewing habits can even be used to provide appropriate commercials that have a high audience acceptance rate for a particular genre of viewers.

Techniques that attempt to determine preferences of a user are known as collaborative filtering. A collaborative filtering system can produce recommendations by determining similarities between one user and other users. The value of this type of information to society increases daily as we move towards an electronic oriented environment where our preferences can be easily disseminated to us by any number of means such as computers, televisions, satellite radios, and other devices that lend themselves to the potential of having interactivity with a user.

The basis of most measures of association, such as those utilized with collaborative filtering, is knowledge of the association between two or more items and some measure of its frequency. Using the prior example, baseball is associated with some people and basketball is associated with some people. In this example, baseball and basketball are features or attributes of a person. Thus, there can be a co-occurrence of both baseball and basketball for some portion of the people. Tracking these co-occurrence events is often done with "counts" that increment whenever a co-occurrence is found. Determining these "counts" in huge databases, however, is not without its problems. Often, the amount of data is so vast that there are computational limits on the systems trying to extract co-occurrence counts from the data. In addition, there can be many attributes associated with an object which compounds the computational challenges. The large computational overhead also limits when the co-occurrences are determined. A user typically will not wait hours, or possibly days, for a database to reveal the information. Thus, the information is typically not mined at all, or it is mined at a significant cost. Users have a strong desire to be able to determine co-occurrence counts without the time and expense that exists with current technology.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data mining, and more particularly to systems and methods for estimating co-occurrence counts for collaborative filtering and for query optimization in relational databases. Data sampling techniques are leveraged to provide an efficient means to determine co-occurrence count estimations, simplifying measure-of-association determinations. By providing an efficient mechanism to estimate co-occurrence counts, instances of the subject invention can be incorporated directly into a database, increasing its versatility and performance for such uses as collaborative filtering recommendations. Other instances of the subject invention can be utilized for enhancing database query selectivity, optimizing query performance through employment of á priori co-occurrence counts. Thus, the efficiency of instances of the subject invention is such that determinations can be made before they are needed and without substantial performance penalties.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

A common subproblem in a variety of systems is to count the co-occurrence of attributes of items. This is important, for example, in estimating query selectivity in database query optimization and also in collaborative filtering to recommend other items that might be of interest. Instances of the subject invention provide systems and methods that facilitate in efficiently determining co-occurrence counts for even extremely large databases via sampling techniques. The sampling techniques permit flexibility in a system as to whether all information is considered, such as with uncommon attributes or small data sets. Alternatively, the technique utilizes a sample for common attributes in large data sets that are too cumbersome to use in their entirety. The co-occurrence counts are useful for determining measures of association such as, for example, mutual information and/or correlation. It is also useful for determining an optimum search query order by allowing á priori count information to be compiled in an efficient manner. The query can then be ordered by starting with the smallest intersecting set first, to substantially reduce the amount of information that must be reviewed.

Instances of the subject invention also provide systems and methods of collaborative filtering (CF) that integrate into relational databases of inventory and transactions. This integration makes the CF system easier to manage, able to recommend from a large number of items, and be very responsive to updated transaction and inventory information. This is valuable because CF systems help people find some of the many items (books, music tracks, etc.) that they would personally like but that are not widely advertised and promoted. Many CF systems work by first extracting information about items and user preferences from an inventory-and-transaction database. These CF systems then process this information and store their own copy of it (or model based on it), finally, this copy or model is utilized by the system to make recommendations.

Figure 1:
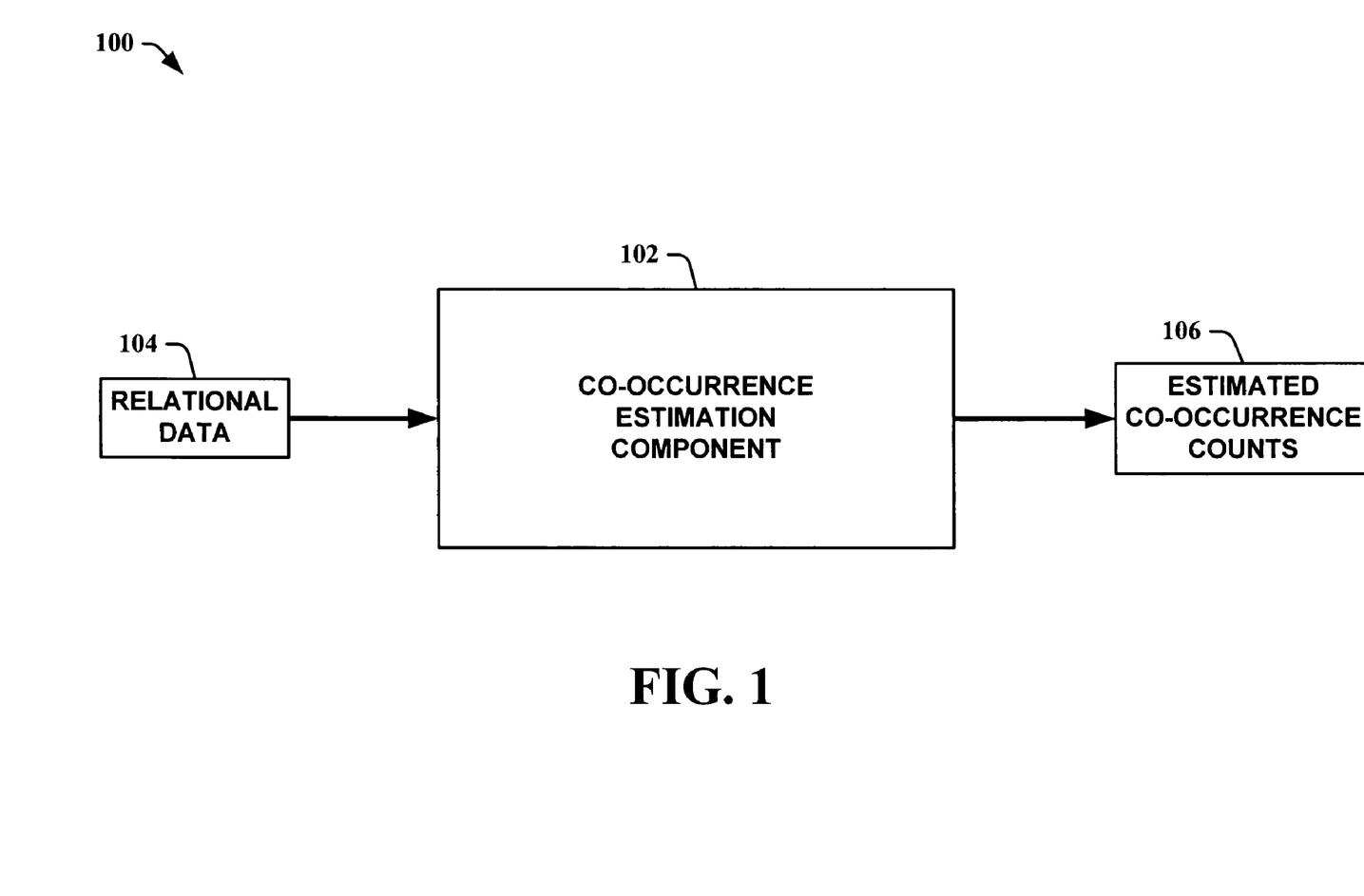
FIG. 1 is a block diagram of a co-occurrence estimation system in accordance with an aspect of the subject invention.

In FIG. 1, a block diagram of a co-occurrence estimation system 100 in accordance with an aspect of the subject invention is shown. The co-occurrence estimation system 100 is comprised of a co-occurrence estimation component 102 that receives relational data 104 and provides estimated co-occurrence counts 106. Note that the relational data can be stored in a database, computer files, or otherwise. The processes utilized by the co-occurrence estimation component 102 allow the estimated co-occurrence counts to be quickly and efficiently determined, providing for a substantial increase in the amount of data that can be processed. The co-occurrence estimation component 102 can reside internal to a database and/or external to a database. Incorporation of the co-occurrence component 102 into a database is easily accomplished due to its minimal size.

The relational data 104 typically contains objects and features that are generally represented in some form of a table. Values are usually associated for the features based on a particular object. One example of such a table can be information related to a user's preferences towards various songs. Thus, the table might include a row for each user (i.e., object) and several columns of songs (i.e., features) with values or ratings denoted for each song. In this manner, the relational data 104 shows relationships between the songs and different users. Likes and dislikes can be mined from this data as counts and utilized to determine whether another user would like a particular song, given the other users' likes and dislikes. Thus, the "counts" represent a means to track the popularity of various features for various objects. A higher count would suggest that a particular feature is highly favored or valued by particular objects.

The counts can also be employed in a reversed process where the intent is to find minimal counts out of various intersections of data. Therefore, the smaller the count, the less data that needs to be processed such as for a search query. For example, a query might have several parts that produce data intersections. By taking a query path that has the least amount of counts first, the data required to be processed is minimized. Thus, obtaining counts can substantially enhance systems that provide measures of association and the like. Because instances of the subject invention can employ sampling techniques, they can efficiently determine these counts without requiring high computational costs. The sampling also permits a reduced amount of data to be processed without substantially decreasing accuracy of the counts. Because of the flexibility of instances of the subject invention, the sampling can include all data or a portion of the data. If the data size is small enough to be efficiently handled, the data in its entirety can be employed as the "sampled data set."

Figure 2:
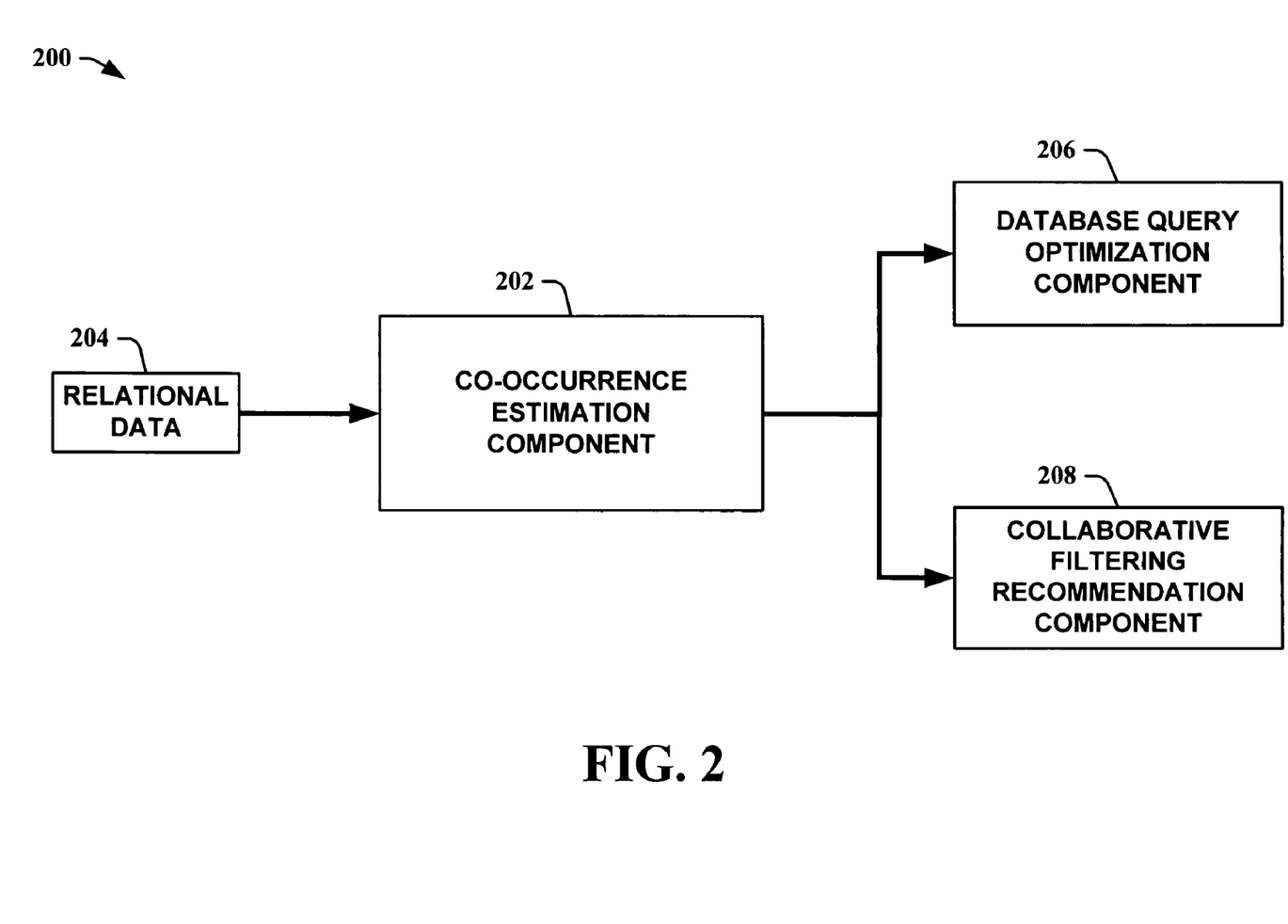
FIG. 2 is a block diagram of example systems that can utilize a co-occurrence estimation system in accordance with an aspect of the subject invention.

Referring to FIG. 2, a block diagram of example systems that can utilize a co-occurrence estimation system 200 in accordance with an aspect of the subject invention is illustrated. In this example depiction, the co-occurrence estimation system 200 is comprised of a co-occurrence estimation component 202 that receives relational data 204 and provides co-occurrence counts to a database query optimization component 206 and/or a collaborative filtering recommendation component 208. FIG. 2 is meant to be representative of the types of systems that can employ instances of the subject invention. One skilled in the art will understand that the subject invention can be employed in other systems as well.

The co-occurrence estimation component 202 can be part of a database optimization system (not explicitly illustrated)

that includes the co-occurrence estimation component 202 and the database query optimization component 206. For example, the co-occurrence estimation component 202 can provide co-occurrence counts á priori for the database query optimization component 206 to utilize when a search query is issued. This allows the database query optimization component 206 to estimate query selectivity and to order its search such that it first selects the smallest intersections of data relevant to the search. In this fashion, it 206 can quickly ascertain search query results for the data query optimization system.

The co-occurrence estimation component 202 can also be part of a collaborative filtering recommendation system (not explicitly illustrated) that includes the co-occurrence estimation component 202 and the collaborative filtering (CF) recommendation component 208. For example, an online service that sells books can utilize the counts provided by the co-occurrence estimation component 202 to make recommendations to customers that frequent the online service. This can increase sales and also increase customer satisfaction because it provides suggestions for products without the customer spending time discovering them. In this example, higher counts indicate that a substantial amount of a genre of customers have purchased or looked at a particular product. If a new customer falls within that genre of customers, they might also be interested in products with higher counts.

Figure 3:
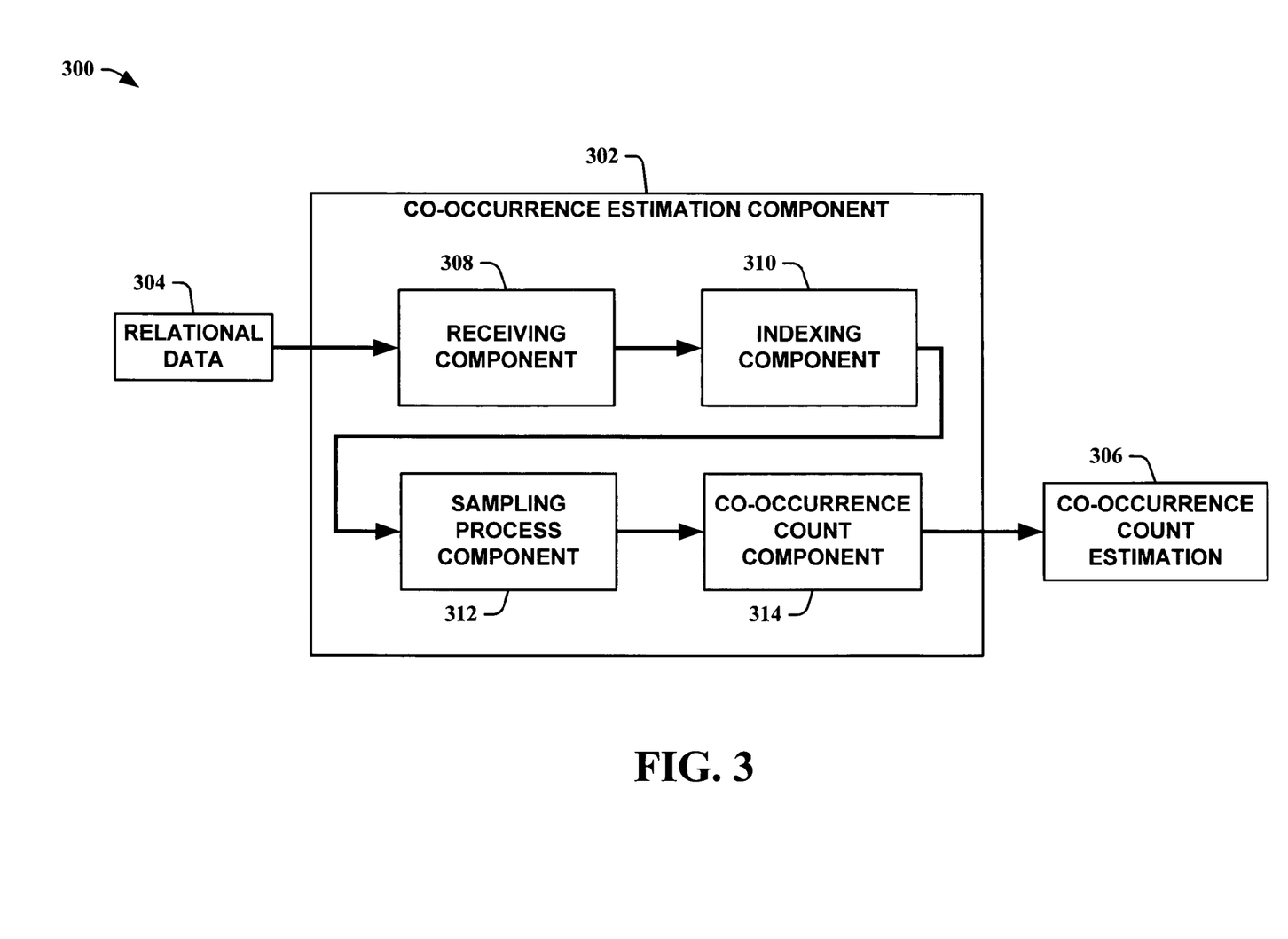
FIG. 3 is another block diagram of a co-occurrence estimation system in accordance with an aspect of the subject invention.

Looking at FIG. 3, another block diagram of a co-occurrence estimation system 300 in accordance with an aspect of the subject invention is depicted. The co-occurrence estimation system 300 is comprised of a co-occurrence estimation component 302 that receives relational data 304 and provides a co-occurrence count estimation 306. The co-occurrence estimation component 302 is comprised of a receiving component 308, an indexing component 310, a sampling process component 312, and a co-occurrence count component 314. The receiving component 308 receives the relational data 304 which is comprised of objects and features with relational ties. The relational data 304 is then passed to the indexing component 310 which creates first and second indexes. The first index provides a means to determine which objects in the relational data 304 have at least one feature associated with it that does not have a default value and/or does not have a specific non-default value. The second index provides a means to determine what non-default valued features are associated with an object. The sampling process component 312 utilizes the indexes to facilitate in determining estimations of counts for relationships for a target feature via employment of sampling techniques of the relational data 304. The first index is utilized to determine what objects contain the target feature, and the second index is utilized to determine what other features of interest are also valued by that object. Counts and parametric data such as, for example, total number of objects, sample size, and required number of objects to reach a desired sample size and the like are passed to the co-occurrence count component 314. The co-occurrence count component 314 utilizes the sampled co-occurrence counts to estimate an overall co-occurrence count in a population and/or a fraction of a population for a given target feature and/or other feature of interest. This provides the co-occurrence count estimation 306. For example, the counts and parametric data are employed to extend via ratio and likelihood techniques and the like to simulate as if an entire population's data was utilized to determine the counts. Various combinations of parametric data gathered during the sampling process can be employed to more accurately estimate the population counts as appropriate. These techniques are discussed in more detail infra.

Relational Database Applications

Instances of the subject invention are applicable to data pertaining to objects that have associated attributes. By estimating the number or "counts" of co-occurrence between different attributes, predictive information can be mined from the relational data. This type of mined data can be utilized to predict likes and dislikes in a collaborative filtering recommendation system and/or utilized to determine an optimized query decision path for database querying and the like.

For example, a relational database can consist of objects such as users and their likes and dislikes with regard to a feature such as a particular song. Abstractly, a dense representation is given in the database such as a table in which rows correspond to objects (e.g., users) and columns correspond to features (e.g., songs). Thus, the entries of the table describe the relationship between the object and features. For instance, in the case of Users and Songs, an entry in TABLE 1 could be the user's rating of the song on a scale of 1 to 10. A zero, for example, in TABLE 1 can represent a lack of a rating input from a user with regard to a particular song.

TABLE 1

Users and Songs

| USER_ID | Song1 | Song2 | Song3 | ... | SongP |
|---------|-------|-------|-------|-----|-------|
| 1       | 4     | 0     | 0     |     | 2     |
| 2       | 0     | 1     | 2     |     | 0     |
| ...     |       |       |       |     |       |
| M       |       |       |       |     |       |

Note that the information contained in TABLE 1 does not need to be stored in this format. For example, in many situations the object table has a dominant value (e.g., there are more zeroes than any other value in TABLE 1). In this case, it is natural to call this value the default value and only store the remaining values. It can then be assumed that, for example, 0 (zero) in TABLE 1 is the default value for all of the features (e.g., songs). Thus, the data can be stored as a transactional representation or TransRep as illustrated In TABLE 2.

TABLE 2

Transactional Representation

| USERID | SONGID | VALUE |
|--------|--------|-------|
| 1      | 1      | 4     |
| 1      | P      | 2     |
| 2      | 2      | 1     |
| ...    |        |       |

Note that the value column is not needed if the features are binary (two values). An alternative representation is the feature-list representation as shown TABLE 3.

TABLE 3

Feature-List Representation

| USERID | SONGID-VALUE PAIRS |
|--------|--------------------|
| 1      | (1, 4), (P, 2)     |
| 2      | (2, 1), (3, 2) ... |
| ...    |                    |
| M      |                    |

Thus, for example, USERID 1 rates SONGID 1 a value of 4 and SONGID P a value of 2, creating value pairs of "(1,4)"

and "(P,2)." It is typical to assign USERIDs and SONGIDs randomly. Even if they have not been initially assigned randomly, it is not problematic to make random reassignments.

In general, there are many types of co-occurrence counts that are of interest to database users. These include various combinations of features that show a relationship to an object and/or other feature. For example, instances of the subject invention for binary variables utilize sampling techniques to derive estimations of four different types of co-occurrence counts, creating "sampled counts." A first sampled count is defined as an estimation of co-occurrence counts of pairs of features in a data set (e.g., TABLE 4 infra). For this example, it is assumed that feature $F_i$ takes on values $0,1,\ldots,V_i$. The marginal counts $N(F_j=k)$ are assumed to be given, or, in other words, the number of objects that have value k for feature j and the total number of objects N are given. A co-occurrence count is denoted by $N(F_i=k,F_j=l)$—the number of objects that have value k for feature i and value l for feature j. Note that if the co-occurrence counts for $N(F_i=k,F_j=l)$ where k and l are not zero are known then the marginal counts and total counts can be utilized to derive all remaining counts. Thus, in the methods described infra, the focus is on estimating these counts.

If the default state (zero) is the most common value for each feature then a large fraction of the counts in the co-occurrence table are in the first row or column and, by only counting the remaining counts, the amount of computation required for computing the table can be substantially reduced. This observation is the basis of some previous work on efficiently counting sparse data (see, D. Chickering and D. Heckerman; Fast Learning from Sparse Data; In *Proceedings of Fifteenth Conference on Uncertainty in Artificial Intelligence*; Stockholm, Sweden; Morgan Kaufmann; Aug. 1999 and A. W. Moore and M. S. Lee; Cached Sufficient Statistics for Efficient Machine Learning with Large Datasets, In *JAIR;* Volume 8, pages 67-91; 1998). Instances of the subject invention leverage this computational reduction while providing a sampling approach to estimating co-occurrence counts.

TABLE 4

Co-occurrence Counts
Feature $F_i$

|  |  | 0 | 1 | ... | Vi |  |
|---|---|---|---|---|---|---|
| Feature $F_j$ | 0 | $N(F_i = 0, F_j = 0)$ | $N(F_i = 1, F_j = 0)$ |  | $N(F_i = V_i, F_j = 0)$ | $N(F_j = 0)$ |
|  | 1 | $N(F_i = 0, F_j = 1)$ |  |  |  | $F(F_j = 1)$ |
|  | ... |  |  |  |  |  |
|  | $V_j$ | $N(F_i = 0, F_j = V_j)$ |  |  | $N(F_i = V_i, F_j = V_j)$ | $N(F_j = V_j)$ |
|  |  | $N(F_i = 0)$ | $N(F_i = 1)$ |  | $N(F_i = V_i)$ | N |

In general, co-occurrence counts are useful for computing mutual information, correlation, and other measures of association. An important special case, illustrated in TABLE 5, is where each feature only has two values. For example, for many interesting CF systems, it suffices to have at hand four counts for each pair of items, where the first item in the pair is an item in which a current user has expressed an interest and the second item is available for recommendation. The four counts are:

$N(F_i=0,F_j=0)$: # of people who showed interest in neither item $N(F_i=1,F_j=0)$: # of people who showed interest in the first item, but not the second $N(F_i=0,F_j=1)$: # of people who showed interest in the second item, but not the first $N(F_i=1,F_j=1)$: # of people who showed interest in both items

TABLE 5

Four Counts per Pair for Binary Valued Features

|  |  | Feature $F_i$ |  |  |
|---|---|---|---|---|
|  |  | 0 | 1 |  |
| Feature $F_j$ | 0 | $N(F_i = 0, F_j = 0)$ | $N(F_i = 1, F_j = 0)$ | $N(F_j = 0)$ |
|  | 1 | $N(F_i = 0, F_j = 1)$ | $N(F_i = 1, F_j = 1)$ | $N(F_j = 1)$ |
|  |  | $N(F_i = 0)$ | $N(F_i = 1)$ | N |

Additional sampled counts include: a second sampled count that is defined as an estimation of co-occurrence counts for one feature and a set of other features; a third sampled count that is defined as an estimation of co-occurrence counts for one feature T and a set of features F given the values of some disjoint third set of features Q; and a fourth sampled count that is defined as an estimation of the co-occurrence counts for one feature T and a set of features F for each possible instantiation of some disjoint third set of features Q.

Instances of the subject invention provide systems and methods for determining these sampled count estimations and an overall count estimation. Examples of these systems and methods are described infra in the context of a database. The illustration utilized is based on an estimation for a 2×2 table, but this can be easily generalized to the case of $V_i \times V_j$, sized tables. Of course, the method can also be applied external to a database as well.

Creating Indexes

Instances of the subject invention employ condensed object and feature association information such as, for example, indexes to provide efficient means to locate pertinent data. Thus, for example, first and second indexes can be constructed to facilitate some instances of the subject invention in determining count estimations. A first index is created that allows one to find all objects (e.g., USERIDs) that have a feature $F_i$ that does not have a default-value (and/or having a specific non-default value). This index facilitates in determining which objects have a valued relationship with feature $F_i$. A second index is created that allows one to find all features with a non-default value for a given object (e.g., USERID). This index facilitates in quickly ascertaining what features have value to each object. Thus, the first index is utilized to determine which objects value feature $F_i$, and the second index is utilized to determine what other features are valued by those objects as well. Each time a relationship between features is found, a co-occurrence count is incremented for that combination. To improve performance, either of the indexes can be constructed as a clustered index. An example program that constructs these indexes for a transactional representation is shown in TABLE 6.

TABLE 6

Example SQL Statements for Constructing Indexes

CREATE INDEX userid-feature on TransRep (USERID ASC);
CREATE INDEX feature-userid on TransRep (SONGID ASC);

Estimating Counts Utilizing Sampling

Instances of the subject invention employ systems and methods that utilize the created indexes to determine count estimations. Thus, given that K is a constant that controls the size of a sample utilized to estimate a co-occurrence count and that $S_{ij}$ is utilized to denote the count in a sample for feature $F_i$ having value, for example, of 1 and feature $F_j$ having a value, for example, of 1, the first sampled count of a co-occurrence estimate for a pair of features $F_i$ and $F_j$ can be estimated, for example, as shown in TABLE 7. This example utilizes users for objects and songs for features.

TABLE 7

Example SQL Statement for Determining the First Sampled Count

SELECT MAX (USERID) AS MAXID, SONGID, COUNT(*)
AS COOCCNT
    FROM (SELECT TOP k USERID FROM TransRep
    WHERE SONGID = 'Fi') as A
    INNER JOIN TrandRep AS B ON A.USERID =
    B.USERID
    GROUP BY SONGID
    WHERE B.SONGID = 'Fj'

The resulting information table has three columns and one row. $S_{ij}$ is the value of the COOCCNT column of this row for this example.

The second sampled count of a co-occurrence estimate for a feature $F_i$ with all other features can be estimated, for example, as shown in TABLE 8.

TABLE 8

Example SQL Statement for Determining
the Second Sampled Count

SELECT MAX(USERID) as MAXID, SONGID, COUNT(*)
AS COOCCNT
    FROM
    (SELECT TOP k USERID FROM TransRep
    WHERE SONGID = 'Fi') as A
    INNER JOIN
    TrandRep AS B ON A.USERID = B.USERID
    GROUP BY SONGID The resulting information table has three columns. The columns MAXID are constant across all rows. The $S_{ij}$ is the value from the COOCCNT column of the row in which SONGID='Fj'.

The third and fourth sampled counts can be determined by utilizing similar queries in which one adds appropriate columns and values to the group by and where clauses of the queries for the first and second sample counts.

In each method, a target feature of interest $F_i$ is utilized along with the indexes to identify K objects with that feature in a non-default state. If the USERIDs (i.e., objects) are randomly assigned, the items selected are a random selection of the users with this feature in the non-default state. The other index is then utilized to quickly count the co-occurrence with other features of interest. The queries for a case of $V_i \times V_j$ tables (i.e., when $F_i$ has $V_i$ possible values and $F_j$ has $V_j$ possible values) is to sample $K_j$ objects (e.g., USERIDs) for each value of $F_j$ (where $K_j$ could be different for each value of $F_j$).

Estimating Overall Co-Occurrence of a Population

For a given target feature $F_i$ and each other feature of interest, a sampled co-occurrence is employed to estimate the overall co-occurrence in a population (or, equivalently, the fraction of the population). Focus is placed on the case where the target feature is $F_i$ and only one other feature $F_j$ is considered as the same technique is utilized separately for each feature. Let $S_{ij}$ be a count in the sample for $F_i$ having a value, for example, of 1 and feature $F_j$ having a value, for example, of 1. And let $C_{ij}$ be an overall estimate of the actual co-occurrence count in the population (i.e., the estimate of $N(F_i=1, F_j=1)$). The queries above yield a value MAXID which is the number of samples needed to obtain K USERIDs that have non-default valued $F_i$ features. Thus, the co-occurrence count can be estimated utilizing at least one of the following techniques:

Estimation technique 1: $C_{ij}=S_{ij}*(N/MAXID)$
Estimation technique 2: $C_{ij}=S_{ij}*(N(F_i=1)/k)$
Estimation technique 3: Use a Hypergeometric likelihood by selecting $C_{ij}$ to be a value that maximizes Eq. 1 (or the rounded value of the max or the integer part of the maximum).

$$\frac{\binom{N(F_i=1, F_j=1)}{C_{ij}}\binom{N(F_i=1, F_j=0)}{K-C_{ij}}}{\binom{N(F_i=1)}{k}} \quad (\text{Eq. 1})$$

Where $$\binom{A}{B}$$

is A choose B (i.e., $A!/(B!*(A-B)!)$).

Estimation technique 4: Sampling with replacement approximation.

These estimation techniques can be adapted to handle $V_i \times V_j$ tables by considering each value of $F_i$ separately utilizing the appropriate value of $K_j$ and a multivariate hypergeometric likelihood.

Figure 4:
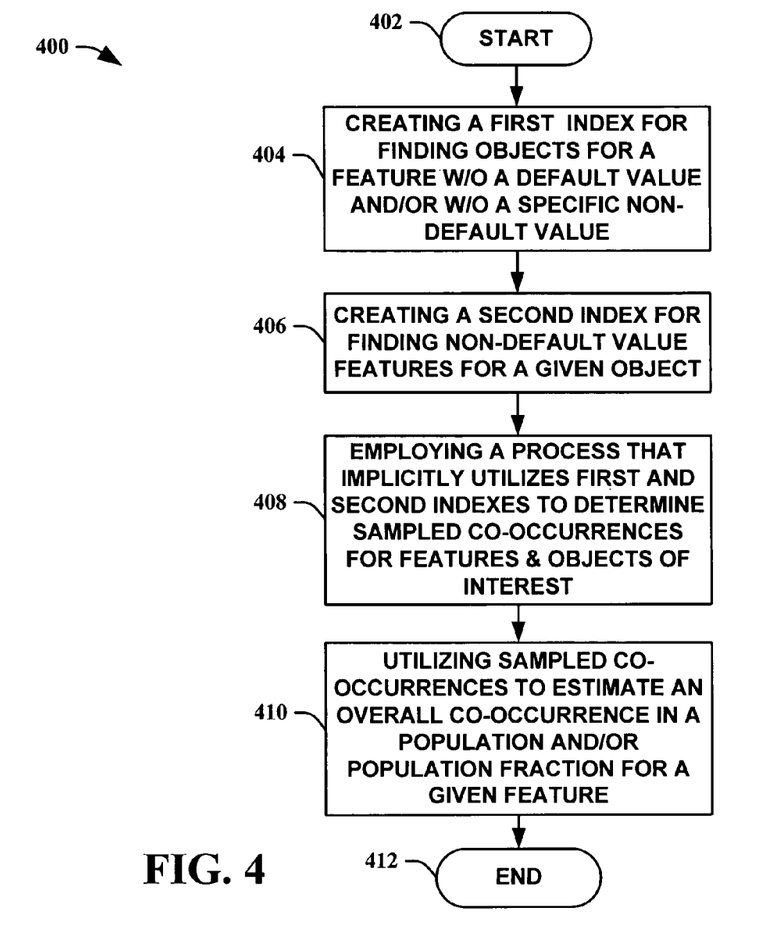
FIG. 4 is a flow diagram of a method of facilitating estimation of co-occurrence counts in accordance with an aspect of the subject invention.
Figure 5:
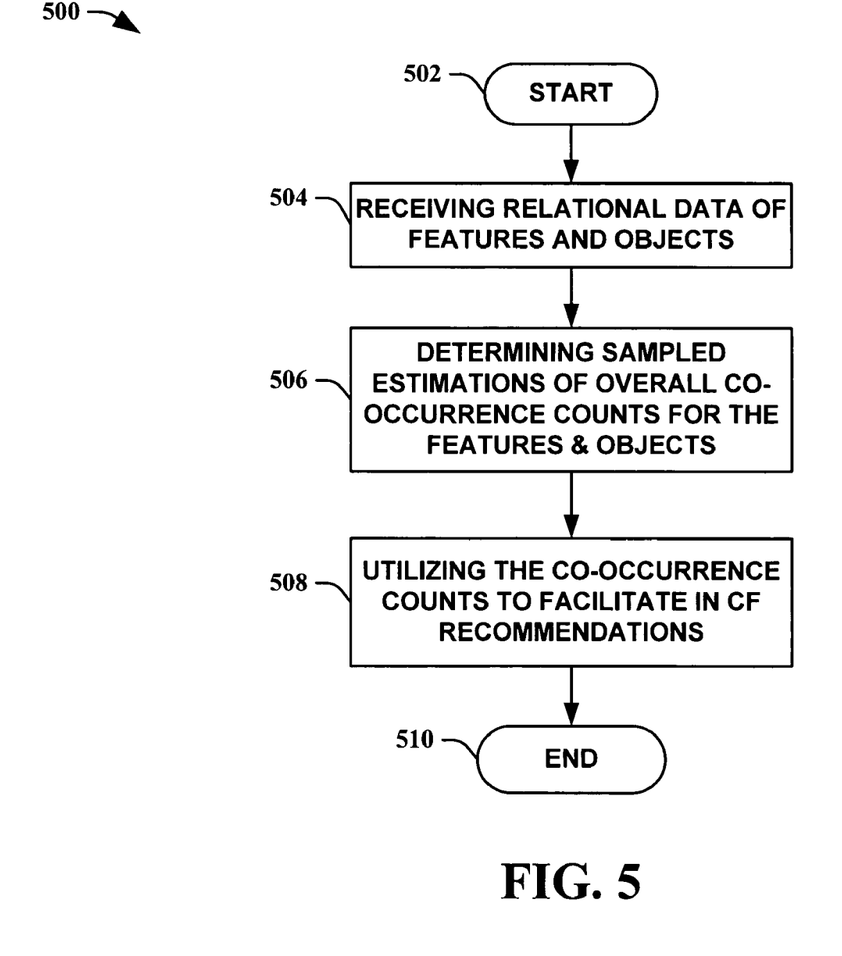
FIG. 5 is a flow diagram of a method of facilitating collaborative filtering recommendations in accordance with an aspect of the subject invention.
Figure 6:
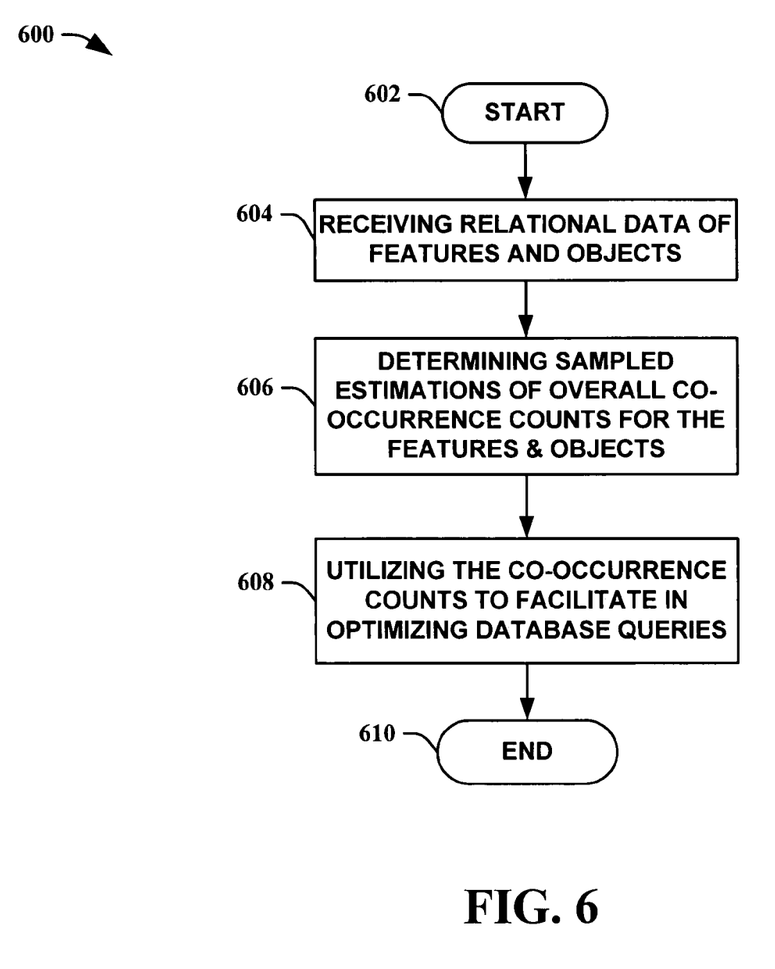
FIG. 6 is a flow diagram of a method of facilitating database query optimization in accordance with an aspect of the subject invention.

In view of the exemplary systems shown and described above, methodologies that may be implemented in accordance with the subject invention will be better appreciated with reference to the flow charts of FIGS. 4-6. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 4, a flow diagram of a method 400 of facilitating estimation of co-occurrence counts in accordance with an aspect of the subject invention is shown. The method 400 starts 402 by creating a first index for finding objects for a feature with a non-default value and/or without a specific non-default value 404. The first index permits easy data mining of objects with possible features of interest. A second index is created for finding non-default value features for a given object 406. The second index permits easy data mining of other features that an object with a feature of interest also values. Typically, co-occurrence counts are tracked for those features found with the feature of interest for a given object. A process is then employed that utilizes the first and second indexes to determine sampled co-occurrences for features and objects of interest 408. In general, an assumption is made that the objects are randomized such that the sampling can be halted when a desired sampling size is met without a distribution penalty for a particular ordering of the objects. Thus, if the first Y objects are checked before finding a positive sample size of Z objects for a particular feature, it is assumed that the Z objects represent a random set of objects. If the objects are not randomized, they can be easily randomized before processing. The process itself generates parametric data that are utilized for estimating population counts. The sampled co-occurrences are then utilized to estimate an overall co-occurrence in a population and/or population fraction for a given feature 410, ending the flow 412. Typically, only a small portion of a data set is sampled. This sample is then extended to be representative of the entire data set via estimation techniques described in detail supra.

The indexes utilized in the supra method provide one means of condensing object and feature association information to more efficiently determine sampled co-occurrences of objects and features of interest. One skilled in the art can appreciate that other means of condensing association information besides indexing is within the scope of instances of the subject invention. Thus, in other methods of instances of the subject invention, an overall co-occurrence is estimated via utilization of sampled co-occurrences of objects and features of interest that are determined, at least in part, by employing condensed object and feature association information from relational data.

Referring to FIG. 5, a flow diagram of a method 500 of facilitating collaborative filtering recommendations in accordance with an aspect of the subject invention is depicted. The method 500 starts 502 by receiving relational data that includes at least one feature and object 504. Overall co-occurrence count estimations are then determined via sampled counts for the features and objects 506. The estimated co-occurrence counts are then employed to facilitate in collaborative filtering recommendations 508, ending the flow 510. Typically, a higher count indicates a higher likelihood that another object will also value a particular feature that received the higher count from similar objects with similar valued features. The efficiency and small size of instances of the subject invention allow it to be incorporated directly into a database. This increases the flexibility of the database system and makes it inherently easier to use, without substantial performance penalties.

Looking at FIG. 6, a flow diagram of a method 600 of facilitating database query optimization in accordance with an aspect of the subject invention is illustrated. The method 600 starts 602 by receiving relational data that includes at least one feature and object 604. Overall co-occurrence count estimations are then determined via sampled counts for the features and objects 606. The estimated co-occurrence counts are then employed to facilitate in optimizing database queries 608, ending the flow 610. Database query performance is often highly dependent on the order in which the query is processed. This is due to the fact that often a query will contain several intersecting sets of data with vastly different sizes. If a query were to start by processing the largest intersecting set of data first, it would greatly reduce its performance. However, if the query order starts with the smallest intersecting set of data first, it can greatly enhance its performance because the amount of data required to be processed to determine query results has also been greatly reduced. For example, a query for "all blue houses built on streets named after an ocean in the state of Washington" is highly dependent on the order in which it is processed. If the query ordered started with finding "all blue houses" first, the list would be quite large. By utilizing an instance of the subject invention, counts for the various intersecting data sets can be known á priori, allowing for greater selectivity in ordering the query search. Thus, the counts might indicate that there are very few streets named after oceans in the state of Washington (i.e., low count number). If the query search starts with this subset of data, it has drastically reduced the amount of data necessary to find just the blue houses from within that data subset.

Figure 7:
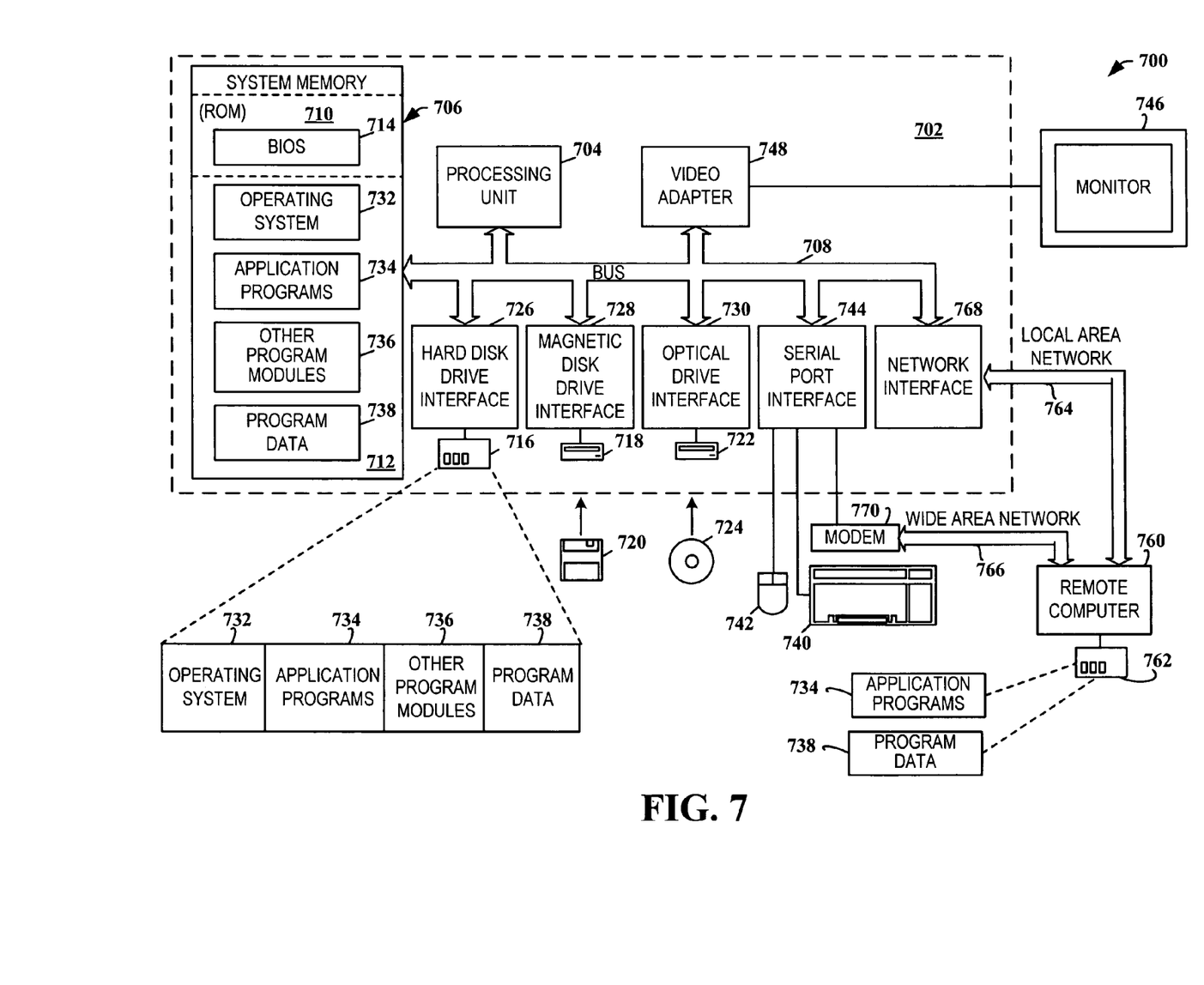
FIG. 7 illustrates an example operating environment in which the subject invention can function.

In order to provide additional context for implementing various aspects of the subject invention, FIG. 7 and the following discussion is intended to provide a brief, general description of a suitable computing environment 700 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 7, an exemplary system environment 700 for implementing the various aspects of the invention includes a conventional computer 702, including a processing unit 704, a system memory 706, and a system bus 708 that couples various system components, including the system memory, to the processing unit 704. The processing unit 704 may be any commercially available or proprietary processor. In addition, the processing unit may be implemented as multi-processor formed of more than one processor, such as may be connected in parallel.

The system bus 708 may be any of several types of bus structure including a memory bus or memory controller, a peripheral bus, and a local bus using any of a variety of conventional bus architectures such as PCI, VESA, Microchannel, ISA, and EISA, to name a few. The system memory 706 includes read only memory (ROM) 710 and random access memory (RAM) 712. A basic input/output system (BIOS) 714, containing the basic routines that help to transfer information between elements within the computer 702, such as during start-up, is stored in ROM 710.

The computer 702 also may include, for example, a hard disk drive 716, a magnetic disk drive 718, e.g., to read from or write to a removable disk 720, and an optical disk drive 722, e.g., for reading from or writing to a CD-ROM disk 724 or other optical media. The hard disk drive 716, magnetic disk drive 718, and optical disk drive 722 are connected to the system bus 708 by a hard disk drive interface 726, a magnetic disk drive interface 728, and an optical drive interface 730, respectively. The drives 716-722 and their associated computer-readable media provide nonvolatile storage of data, data structures, computer-executable instructions, etc. for the computer 702. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 700, and further that any such media may contain computer-executable instructions for performing the methods of the subject invention.

A number of program modules may be stored in the drives 716-722 and RAM 712, including an operating system 732, one or more application programs 734, other program modules 736, and program data 738. The operating system 732 may be any suitable operating system or combination of operating systems. By way of example, the application programs 734 and program modules 736 can include a co-occurrence count estimation scheme in accordance with an aspect of the subject invention.

A user can enter commands and information into the computer 702 through one or more user input devices, such as a keyboard 740 and a pointing device (e.g., a mouse 742). Other input devices (not shown) may include a microphone, a joystick, a game pad, a satellite dish, a wireless remote, a scanner, or the like. These and other input devices are often connected to the processing unit 704 through a serial port interface 744 that is coupled to the system bus 708, but may be connected by other interfaces, such as a parallel port, a game port or a universal serial bus (USB). A monitor 746 or other type of display device is also connected to the system bus 708 via an interface, such as a video adapter 748. In addition to the monitor 746, the computer 702 may include other peripheral output devices (not shown), such as speakers, printers, etc.

It is to be appreciated that the computer 702 can operate in a networked environment using logical connections to one or more remote computers 760. The remote computer 760 may be a workstation, a server computer, a router, a peer device or other common network node, and typically includes many or all of the elements described relative to the computer 702, although for purposes of brevity, only a memory storage device 762 is illustrated in FIG. 7. The logical connections depicted in FIG. 7 can include a local area network (LAN) 764 and a wide area network (WAN) 766. Such networking environments are commonplace in offices, enterprise-wide computer networks, intranets and the Internet.

When used in a LAN networking environment, for example, the computer 702 is connected to the local network 764 through a network interface or adapter 768. When used in a WAN networking environment, the computer 702 typically includes a modem (e.g., telephone, DSL, cable, etc.) 770, or is connected to a communications server on the LAN, or has other means for establishing communications over the WAN 766, such as the Internet. The modem 770, which can be internal or external relative to the computer 702, is connected to the system bus 708 via the serial port interface 744. In a networked environment, program modules (including application programs 734) and/or program data 738 can be stored in the remote memory storage device 762. It will be appreciated that the network connections shown are exemplary and other means (e.g., wired or wireless) of establishing a communications link between the computers 702 and 760 can be used when carrying out an aspect of the subject invention.

In accordance with the practices of persons skilled in the art of computer programming, the subject invention has been described with reference to acts and symbolic representations of operations that are performed by a computer, such as the computer 702 or remote computer 760, unless otherwise indicated. Such acts and operations are sometimes referred to as being computer-executed. It will be appreciated that the acts and symbolically represented operations include the manipulation by the processing unit 704 of electrical signals representing data bits which causes a resulting transformation or reduction of the electrical signal representation, and the maintenance of data bits at memory locations in the memory system (including the system memory 706, hard drive 716, floppy disks 720, CD-ROM 724, and remote memory 762) to thereby reconfigure or otherwise alter the computer system's operation, as well as other processing of signals. The memory locations where such data bits are maintained are physical locations that have particular electrical, magnetic, or optical properties corresponding to the data bits.

Figure 8:
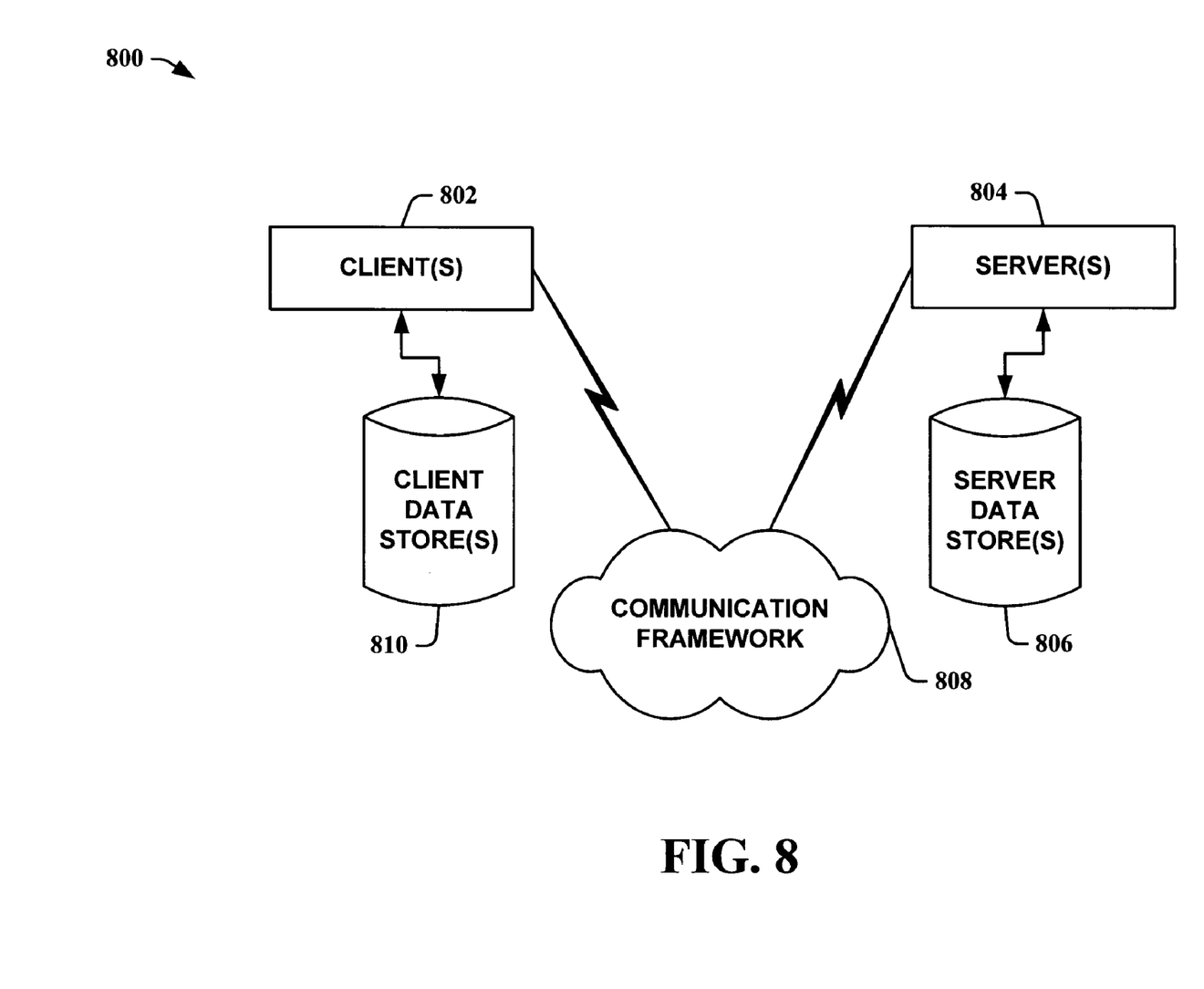
FIG. 8 illustrates another example operating environment in which the subject invention can function.

FIG. 8 is another block diagram of a sample computing environment 800 with which the subject invention can interact. The system 800 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 may be in the form of a data packet adapted to be transmitted between two or more computer processes. The system 800 includes a communication framework 808 that can be employed to facilitate communications between the client(s) 802 and the server(s) 804. The client(s) 802 are connected to one or more client data store(s) 810 that can be employed to store information local to the client(s) 802. Similarly, the server(s) 804 are connected to one or more server data store(s) 806 that can be employed to store information local to the server(s) 804.

It is to be appreciated that the systems and/or methods of the subject invention can be utilized in co-occurrence count estimation facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitate estimation of co-occurrence counts, comprising:
   a memory and a processor;
   a receiving component that receives relational data representative of at least one object and at least one target feature and one additional feature;
   an indexing component that creates first and second indexes based on the relational data, the first index utilized to determine objects that have at least one feature that does not have a default value, or does not have a specific non-default value and the second index utilized to determine features with a non-default value for a given object;
   a sampling process component that utilizes the first and second indexes to determine at least one sampled co-occurrence for at least one feature and object of interest, the determination of the sampled co-occurrence excludes features with default values; and
   a co-occurrence count component that utilizes the sampled co-occurrence to estimate an overall co-occurrence count in a population between a given target feature and other features of interest, wherein estimating the overall co-occurrence count comprises at least one of the following:
      utilizing $C_{ij}=S_{ij}*(N/MAXID)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and MAXID represents a number of samples needed to obtain k objects that have non-default valued $F_i$ features;
      utilizing $C_{ij}=S_{ij}*(N(F_i=1)/k)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and k represents a number of objects needed to obtain a number of samples, MAXID, which have non-default valued $F_i$ features; or
      employing a Hypergeometric likelihood process that utilizes a $C_{ij}$ selected to be a value that maximizes Eq. 1:

$$\frac{\binom{N(F_i=1, F_j=1)}{C_{ij}}\binom{N(F_i=1, F_j=0)}{K-C_{ij}}}{\binom{N(F_i=1)}{k}}.$$

2. The system of claim 1 incorporated into a database.

3. The system of claim 1 utilized to optimize at least one database query.

4. The system of claim 1 employed to facilitate at least one collaborative filtering recommendation.

5. The system of claim 1, the indexing component employs clustering techniques to create the first and/or second index.

6. The system of claim 1, the first and/or second index comprising a transactional and/or feature-list representation.

7. The system of claim 1, the object comprising a user and the feature comprising a song.

8. A method for facilitating estimation of co-occurrence counts, comprising:
   employing at least one process that utilizes condensed object and feature association information from relational data to determine at least one sampled co-occurrence for at least one feature and object of interest, the determination of the at least one sampled co-occurrence does not include features with dominant values; and
   utilizing the sampled co-occurrences to estimate an overall co-occurrence count in a population between a given target feature and other features of interest, wherein estimating the overall co-occurrence count comprises at least one of the following:
      utilizing $C_{ij}=S_{ij}*(N/MAXID)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and MAXID represents a number of samples needed to obtain k objects that have non-default valued $F_i$ features;
      utilizing $C_{ij}=S_{ij}*(N(F_i=1)/k)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and k represents a number of objects needed to obtain a number of samples, MAXID, which have non-default valued $F_i$ features; or
      employing a Hypergeometric likelihood process that utilizes a $C_{ij}$ selected to be a value that maximizes Eq. 1:

$$\frac{\binom{N(F_i=1, F_j=1)}{C_{ij}}\binom{N(F_i=1, F_j=0)}{K-C_{ij}}}{\binom{N(F_i=1)}{k}}.$$

9. The method of claim 8 further comprising:
   estimating the overall co-occurrence utilizing a sampling with replacement approximation.

10. The method of claim 8, the object comprising a user and the feature comprising a song.

11. The method of claim 8 implemented in a database.

12. A computer-implemented system that facilitates estimation of co-occurrence counts, comprising:
   a memory and a processor;
   means for receiving relational data representative of at least one object and at least one target feature and one additional feature;
   means for condensing object and feature association information of the representative relational;
   means for determining at least one sampled co-occurrence for at least one feature and object of interest utilizing the condensed object and feature association information, the determination of the at least one sampled co-occurrence does not include features with dominant values; and
   means for employing the sampled co-occurrence to estimate an overall co-occurrence count in a population between a given target feature and other features of interest, wherein estimating the overall co-occurrence count comprises at least one of the following:

utilizing $C_{ij}=S_{ij}*(N/MAXID)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and MAXID represents a number of samples needed to obtain k objects that have non-default valued $F_i$ features;

utilizing $C_{ij}=S_{ij}*(N(F_i=1)/k)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and k represents a number of objects needed to obtain a number of samples, MAXID, which have non-default valued $F_i$ features; or employing a Hypergeometric likelihood process that utilizes a $C_{ij}$ selected to be a value that maximizes Eq. 1:

$$\frac{\binom{N(F_i=1, F_j=1)}{C_{ij}}\binom{N(F_i=1, F_j=0)}{K-C_{ij}}}{\binom{N(F_i=1)}{k}}.$$

13. The system of claim 12 further comprising:
means for utilizing the overall co-occurrence count to facilitate in optimizing a database query.

14. The system of claim 12 further comprising:
means for utilizing the overall co-occurrence count to facilitate in a recommendation via a collaborative filtering process.

15. A device employing the method of claim 8 comprising at least one selected from the group consisting of a computer, a server, and a handheld electronic device.

16. A collaborative filtering recommendation process that utilizes the method of:

employing at least one process that utilizes condensed object and feature association information from relational data to determine four different types of sampled co-occurrence for at least one feature and object of interest, a first sampled count is an estimation of co-occurrence counts of pairs of features, the second sampled count is an estimation of co-occurrence counts for one feature and a set of other features, a third sampled count is an estimation of co-occurrence counts for one feature and a set of features given the value of some disjoint third set of features, a fourth sampled count is an estimation of co-occurrence counts for one feature and a set of features for each possible instantiation of the disjoint third set of features; and utilizing the at least one sampled co-occurrences to estimate an overall co-occurrence counts in a population between a given target feature and other features of interest, wherein estimating the overall co-occurrence counts comprises at least one of the following:

utilizing $C_{ij}=S_{ij}*(N/MAXID)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and MAXID represents a number of samples needed to obtain k objects that have non-default valued $F_i$ features;

utilizing $C_{ij}=S_{ij}*(N(F_i=1)/k)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and k represents a number of objects needed to obtain a number of samples, MAXID, which have non-default valued $F_i$ features; or employing a Hypergeometric likelihood process that utilizes a $C_{ij}$ selected to be a value that maximizes Eq. 1:

$$\frac{\binom{N(F_i=1, F_j=1)}{C_{ij}}\binom{N(F_i=1, F_j=0)}{K-C_{ij}}}{\binom{N(F_i=1)}{k}}.$$

17. A database query optimization process that utilizes the method of:

employing at least one process that utilizes condensed object and feature association information from relational data to determine at least one sampled co-occurrence for at least one feature and object of interest, the determination of the at least one sampled co-occurrence does not include features with dominant values; and utilizing the sampled co-occurrences to estimate an overall co-occurrence count in a population between a given target feature and other features of interest, wherein estimating the overall co-occurrence count comprises at least one of the following:

utilizing $C_{ij}=S_{ij}*(N/MAXID)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and MAXID represents a number of samples needed to obtain k objects that have non-default valued $F_i$ features;

utilizing $C_{ij}=S_{ij}*(N(F_i=1)/k)$, where $C_{ij}$ represents an estimation of an actual co-occurrence count in a population and/or fraction of a population, $S_{ij}$ represents a count in a sample for feature $F_i$ having a value of 1 and feature $F_j$ having a value of 1, N represents a total number of objects, and k represents a number of objects needed to obtain a number of samples, MAXID, which have non-default valued $F_i$ features; or employing a Hypergeometric likelihood process that utilizes a $C_{ij}$ selected to be a value that maximizes Eq. 1:

$$\frac{\binom{N(F_i=1, F_j=1)}{C_{ij}}\binom{N(F_i=1, F_j=0)}{K-C_{ij}}}{\binom{N(F_i=1)}{k}}.$$

* * * * *